US008483667B2

(12) United States Patent
Ferris

(10) Patent No.: US 8,483,667 B2
(45) Date of Patent: Jul. 9, 2013

(54) MOBILE TELEPHONE WITH RECEIVE ONLY MODE

(75) Inventor: Gavin Robert Ferris, London (GB)

(73) Assignee: Logitech Europe S.A., Morges (CH)

( * ) Notice: Subject to any disclaimer, the term of this patent is extended or adjusted under 35 U.S.C. 154(b) by 795 days.

(21) Appl. No.: 11/374,495

(22) Filed: Mar. 13, 2006

(65) Prior Publication Data

US 2006/0154600 A1 Jul. 13, 2006

Related U.S. Application Data

(63) Continuation of application No. 10/240,461, filed as application No. PCT/GB01/01304 on Mar. 23, 2001, now abandoned.

(30) Foreign Application Priority Data

Mar. 31, 2000 (GB) .................................. 0007875.8

(51) Int. Cl.
*H04M 3/42* (2006.01)
(52) U.S. Cl.
USPC .................. 455/414.1; 455/414.2; 455/414.3; 455/414.4; 455/422.1; 455/550.1
(58) Field of Classification Search
USPC ............. 455/414.1–414.4, 422.1, 550.1, 457, 455/566
See application file for complete search history.

(56) References Cited

U.S. PATENT DOCUMENTS

| 6,185,295 B1* | 2/2001 | Frederiksen et al. | 379/355.05 |
| 6,690,931 B2 | 2/2004 | Heo | |
| 7,299,267 B1* | 11/2007 | Pedersen et al. | 709/217 |
| 2003/0104832 A1 | 6/2003 | Ferris | |
| 2003/0181201 A1* | 9/2003 | Bomze et al. | 455/414.3 |

FOREIGN PATENT DOCUMENTS

| EP | 0977448 A2 | 2/2000 |
| GB | 2320860 A | 7/1998 |
| WO | WO 96/26614 * | 8/1996 |
| WO | WO 9626614 A | 8/1996 |
| WO | WO 9931828 A | 6/1999 |

OTHER PUBLICATIONS

Final Office Action for U.S. Appl. No. 10/240,461 mailed on Sep. 14, 2005; 9 pages.
Non-Final Office Action for U.S. Appl. No. 10/240,461 mailed Feb. 18, 2005; 8 pages.
International Search Report for PCT/Application No. PCT/GB01/01304 mailed on Jul. 9, 2001; 2 pages.

\* cited by examiner

*Primary Examiner* — Wayne Cai
(74) *Attorney, Agent, or Firm* — Kilpatrick Townsend & Stockton LLP

(57) ABSTRACT

A mobile telephone network is configured to transmit information, such as TV network scheduling, which can be received by receivers "eavesdropping" on the system. A mobile telephone can be configured to receive only, avoiding the battery drain which results from its transceiver needing to periodically handshake with the network transceiver.

9 Claims, 2 Drawing Sheets

MOBILE TELEPHONE WITH RECEIVE ONLY MODE

CROSS REFERENCE TO RELATED APPLICATIONS

This application claims the priority of U.S. application Ser. No. 10/240,461 filed Sep. 30, 2002 and PCT application No. PCT/GB01/01304 filed 23 Mar. 2001 and British application GB0007875.8 filed 31 Mar. 2000.

FIELD OF THE INVENTION

The present invention relates to a communications network, a method of operating that network and apparatus for receiving information transmitted by that network

BACKGROUND

Digital cellular telephone services are well established in many countries of the world and coverage, both of the geographical area and the population of those countries is generally very good. With the advent of digital telephones operating under the Wireless Application Protocol (WAP) access to many data sources is available. However, this access must be specifically requested by the user and then the requested information transmitted specifically to that user's telephone. This consumes the user's time, money (in call charges) and the limited energy stored in the battery of the user's phone as well as tying up network capacity that could be devoted to other services.

The present invention has the object of ameliorating the above disadvantages.

SUMMARY OF THE INVENTION

According to a first aspect of the present invention there is provided a method of transmitting information to a plurality of users over a bi-directional cellular communication network which network comprises a plurality of geographically dispersed transceiving stations, the method comprising: receiving digital data representing the information; and transmitting the digital data from at least two of the geographically dispersed transceivers.

The present inventors have realised that a very large proportion of the information that users of digital mobile telephones require is going to be of interest to a great many of the users of the telephone network. For example, television schedules, share and currency prices and gambling odds for sporting events. It is particularly this dynamic information that users will want to access "on the move".

By, in effect, using the mobile communications network to "broadcast" this information a number of benefits ensue. Firstly, useable network capacity is likely to increase because the information is only transmitted on one channel in each cell of the system (although periodic or multiple transmissions may be used to improve user-friendliness). Secondly, the battery energy of the user's telephones is conserved because they can receive this information without having to request it and without participating in the usual "handshaking" that accompanies communication between a network and a mobile telephone.

This can be taken further to extend the battery life by providing an extra operating mode on a mobile telephone. Presently, such telephones have two operating modes— broadly "on" and "off". In the "on" mode, the phone will periodically transmit a message in a control channel to the transceiving station covering the geographical location of the phone. At present this gives a battery life of about 120 hours without making or taking any calls. In the "off" mode this does not happen and battery energy is conserved. However, the user will not be "registered" with the network and so he will not be able to receive calls.

In accordance with a second aspect of the present invention there is provided a transceiver for use with a cellular communications network which network comprises one or more transceiving stations, the transceiver comprising means for, in a first mode, registering with the or a transceiving station and for responding to communications destined for the transceiver, and in a second mode, means for operating receiver circuitry only.

Thus a further mode of operation is provided in which only the receiver of the mobile telephone is active. This may usefully be referred to as the "eavesdropping" mode. Because receiver circuitry operates at a very much lower power than transmit circuitry battery life in this mode can be ten times longer than that in the "on" mode. It is possible, of course, to receive the broadcast signals in the "on" mode as well.

The network operators also have the opportunity of providing another class of service in which the subscriber is provided with a receiver only to access the "broadcast" information without having access to "normal" use of the network. Because of the much-reduced battery power required, the subscriber unit can be made very small and very cheap.

According to a third aspect of the present invention, there is provided a receiver for use with a communication network which network comprises a one or more transceiving stations, the receiver comprising means for monitoring at least a control channel of signals transmitted from the or a transceiving station; and receiving digital data in response to a predetermined signal on the control channel.

In a preferred embodiment the receiver comprises a transceiver whose transmit circuitry has been disabled. This allows the huge economies of scale available to mobile telephone manufacturers to be exploited. The modification may usually be made in hardware or software, or, where required, both.

According to a fourth aspect of the present invention there is provided a method of modifying a transceiver manufactured for use in a cellular telephone, the method comprising: permanently disabling the transmitter portion of the transceiver circuit.

According to a fifth aspect of the present invention, there is provided a transceiving station for a cellular communications network, the transceiving station comprising: means for transmitting digital data on a virtual channel to a plurality of users.

According to a sixth aspect of the present invention, there is provided a cellular communications network comprising a plurality of transceiving stations, each transceiving station comprising: means for transmitting digital data on a virtual channel to a plurality of users.

BRIEF DESCRIPTION OF THE DRAWINGS

The present invention will now be described, by way of example, with reference to the accompanying drawings, in which.

DETAILED DESCRIPTION

Figure 1:
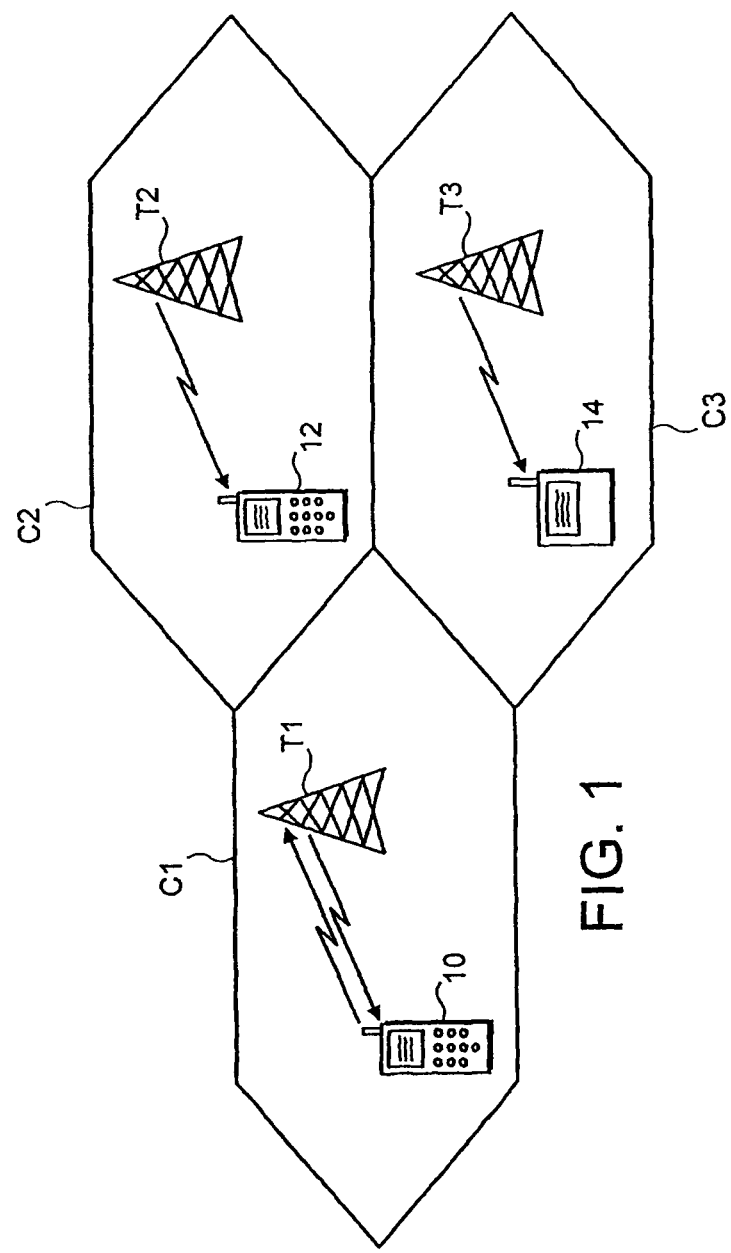
FIG. 1 shows receivers and transceivers receiving broadcasts from a land based cellular communications network.

FIG. 1 shows three cells C1, C2, C3 of a cellular transceiver system each having a respective transceiving station T1, T2, T3. The cells are illustrated as hexagonal areas (as is traditional) but, of course, in practice the areas served will be irregular in shape and generally overlap somewhat. The network may operate under GSM, GPRS, EDGE, UMTS, CDMA-One, I-Mode, IS-136, CDMA-2000 or any other suitable standards. While the invention can readily be implemented on packet-mode systems it may equally be implemented in circuit-mode systems.

A regular digital mobile telephone 10 is shown in cell C1 and this telephone is "on" and so is registered with that cell of the network. This telephone can make calls, receive calls, request information using the Wireless Application Protocol (W AP) and so on. In addition, however the telephone is arranged to monitor a particular channel amongst those transmitted in cell C1. This is preferably a paging control channel but it may be a logical or physical channel as desired. This channel comprises the Broadcast information channel in accordance with one aspect of the invention. Where a channel is constantly allocated then those subscribers who want to access the broadcast information can activate their phones to monitor that channel. Alternatively, the phones may do this automatically and store the latest transmission pertaining to each type of information. The data may be encoded to ensure that only those subscribers that pay for the service may access it.

When an appropriate message has been detected the phone can download it without having to log onto the network (with all of the power consumption and bandwidth consumption issues that that entails).

The data will be stored in the on-board memory of the telephone and retrieved at the user's convenience by operation of the buttons on the phone to navigate through the various pieces of information stored. The information may be a broadcast WML deck over WAP or any other suitable format.

The modifications required of the phone will be discussed in greater detail below. In cell C2 there is a modified mobile telephone 12 which is provided with another mode of operation in addition to those two normally provided on digital mobile telephones. In addition to the standard "on" and "off" modes a further mode is provided which can best be described as "eavesdropping". The transmit circuitry of the phone is powered down and the phone no longer registers with the network. The removal of the necessity of having to register periodically can extend battery life by ten times that of "on" or "standby" mode, even if no calls are made.

In cell C3 there is a receive-only unit 14 which may pick up the Broadcast massages but, having no transmitter, cannot log onto the network for making calls. Such a unit may be made very compact because only enough battery power to receive need be provided. Alternatively, such a receiver may be provided as an accessory (or plug-in card) for a personal computer, especially a portable computer, to allow cheap and up-to the minute downloading of share information and the like.

One very cost-effective way of manufacturing such a receiver consists of modifying the transceivers made by mobile telephone manufacturers. Because of economies of scale it may well be cheaper to start with such a transceiver and disable the transmitter portion than to provide a receiver-only circuit. This will be discussed in greater detail with reference to FIG. 3 below.

The network operator may modify their transceiving stations and transmission network technology to allow transmission of messages to "virtual" network users in broadcast mode, where the transmission of non-terminated messages is not covered in the cellular specification.

The information transmitted over the cellular network may comprise or include identification details for suitably-equipped mobile telephones to obtain information over other, parallel broadcast links—for example the use of Eureka-147 data channel to broadcast WML stacks to phones equipped with suitable radio frequency circuitry and demodulation.

Figure 2:
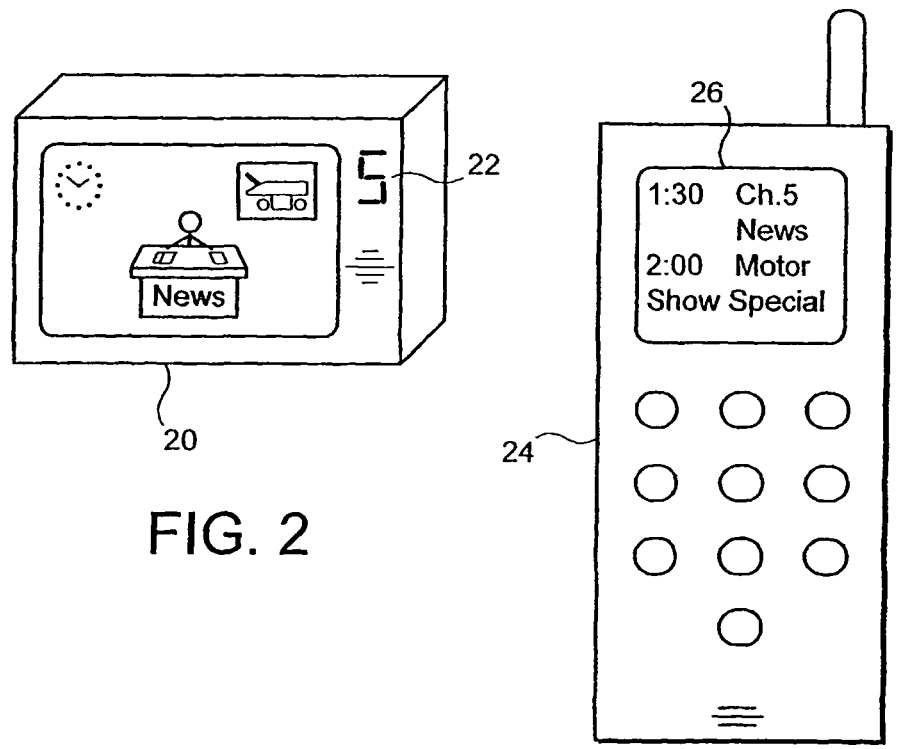
FIG. 2 shows a cellular telephone in accordance with an embodiment of the invention being used to access schedule information for broadcast media.

FIG. 2 shows a mobile telephone modified in accordance with an aspect of the invention being used in conjunction with a broadcast receiver, in this case a television receiver, 20. A channel indicator 22 on the television shows that the television is tuned to channel 5 and a news program is showing at 1:50 p.m. The viewer also has a mobile telephone 24 equipped to receive broadcast data comprising television schedules. These are provided to the operator of the communication network regularly by the broadcaster or schedule provision service. Preferably this happens frequently so that late changes to the schedule may be advised to the user.

By navigating appropriately through the user interface of the phone 24, the schedule for channel 5 is displayed to the user on the LCD 26 of the telephone. The user can then see that the news continues until 2 p.m. and that a Motor Show Special follows. Of course the user can equally check the schedule for other channels, different times and so on.

While the example of FIG. 2 shows television schedule information many different classes of information may beneficially be broadcast in accordance with the invention.

Some particular examples are odds for horse-race betting, share prices and travel information. By broadcasting the information in a number of geographically dispersed cells, then rather than have a number of users in each cell of the network accessing this information personally, their phone can automatically download the latest information regardless of their location, so it will be immediately available when required. Geographically-dependent information such as weather conditions may be transmitted only in those cells for which it is appropriate.

The received information can be stored by the telephone, or receiver, for later use. A menu system may provide for ease of access, and stored information may be updated automatically when re-broadcast. The system is particularly suitable for transmitting information relating to current events, as described in WO 99/04568, the contents of which are incorporated herein by reference. Thus information on price or availability of products being displayed in a TV program may be transmitted, and displayed at the appropriate time on the telephone display. The telephone may be adapted to receive an access telephone number incorporated in the transmitted information. If the user wishes to purchase an item shown on the TV, details of which are being transmitted via the cellular network, he can immediately call the number to place an order.

Means may be provided to seamlessly switch the telephone or receiver to a transmit mode, to establish a voice or data connection. This could be provided by a one button user operation and/or by software in the receiver and/or code in the received signal. The user is thus enabled to respond easily to any suggestion to purchase an item. Equally, the telephone/receiver may be triggered to transmit information regarding past or current usage etc., without disturbing the user.

Figure 3:
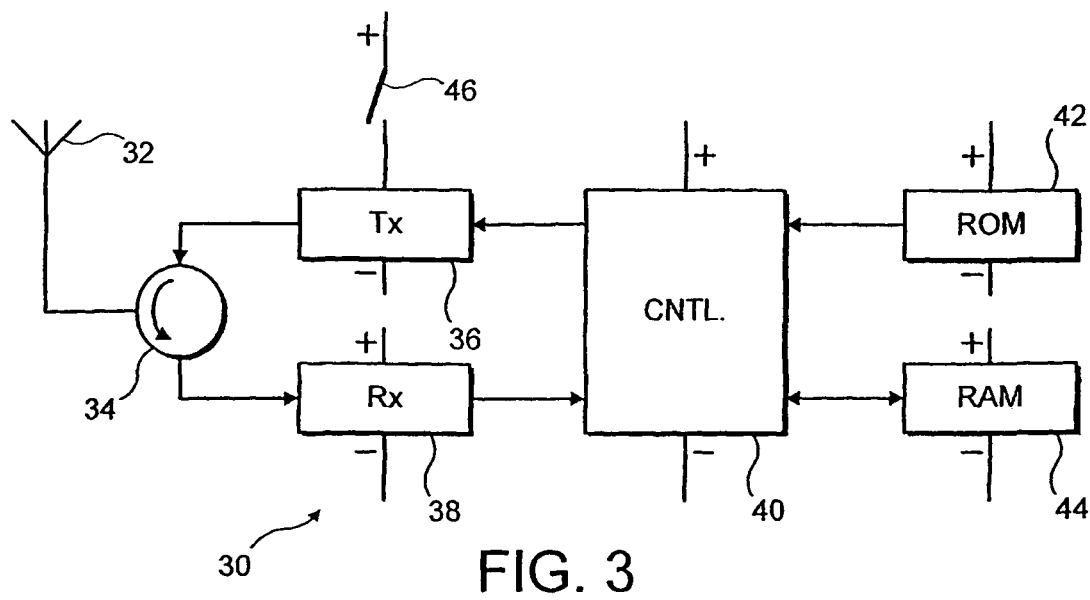
FIG. 3 shows a block schematic diagram of a cellular telephone transceiver and a modification thereto in accordance with a preferred embodiment of the invention.

FIG. 3 shows a block schematic diagram of a mobile telephone transceiver 30 in accordance with an embodiment of the invention. An antenna 32 is connected to a circulator whose purpose is to route signals from a transmitter 36 to the antenna and received signals to a receiver 38. The transmitter and receiver are both connected to a controller 40 which will usually comprise a programmed microprocessor together with the necessary interfaces and so on. Connected to the controller are a read only memory (ROM) 42 and a random access memory (RAM) 44. The ROM stores the operating software for the controller 40 while the RAM stores, among other things, the information received via the broadcast channel from the mobile telephone network. Each element of the transceiver is shown as having a power supply depicted by short lead lines and +/−symbols.

In the case of the transmitter the positive lead line is provided with a switch 46. This is really intended to symbolise this aspect of the invention because the telephone will usually be provided with a means of powering-down the transmitter under software control. By cutting the battery power to the transmitter the battery life may be extended by ten times or more. Furthermore, the power may be removed from the receive circuitry and even the controller to further enhance battery life. A low-power timer circuit may, as is well known, be used to "wake up" the circuitry at appropriate intervals.

The channel or channels to be monitored may change over time or be in different cells of the network. The network is therefore preferably provided with the means to transmit control information to the telephones within the cell to instruct them to commence monitoring, for example, a different channel or at a different listening period.

Information may be transmitted intermittently and/or repetitively and may be transmitted over a variety of channels, for example as those channels become available from 'normal' use—so that only 'spare' network capacity is made use of. Packets of information may be identified to avoid repetitive loading of the same information. Where a number of channels are transmitted on simultaneously, identifiers or a menu may be transmitted to enable the receiver to locate automatically the appropriate channel for information requested by the user or to follow when channels are being switched. Thus the user may need to lock on to an information stream relevant to a program being broadcast on BBC1 if that stream carries a high information content to suit the program.

In the case of the receive-only embodiment of the invention (14 in FIG. 1) this connection is broken permanently—for example by programming the ROM of the unit never to activate the transmitter 36. In the case of the three-mode telephone (12 in FIG. 1) this connection is broken in the further mode. The break is temporary so that the transmitter can again be used when the phone is again switched "on".

One of the particular benefits of using existing transceiver circuitry is that, since the transmitter is not modified (or is even disabled) the radio frequency interference issues surrounding the equipment have not changed. In other words, if the circuitry has already received approval from the relevant regulatory bodies it will not generally need to be re-submitted for further approval. This provides significant savings in terms of both time and cost.

While the information used in the above examples the described data is text information intended for display to the user (under control of that user as appropriate) this need not be the case in practice. The payload of the system may be, for example, an audio signal transmitted in MP3 format or other digital signals. Thus a blind person can use their mobile phone to receive news, weather reports and so on that are read out to them.

The invention claimed is:

1. A mobile terminal comprising:
   (a) a cellular telephony transceiver configured to (i) to receive broadcast data from a cellular telephone network, said broadcast data being simultaneously broadcast to multiple mobile terminals and (ii) transmit data to the cellular telephone network; and
   (b) a display to display elements of the broadcast data; wherein the cellular telephony transceiver is adapted to be capable of not regularly registering with the cellular telephone network, wherein the transceiver is adapted to register with the cellular telephone network in order to transmit data, in response to a user selecting elements of the broadcast data displayed on the terminal.

2. The terminal of claim 1 in which transmit circuitry in the transceiver is permanently disabled in hardware.

3. The terminal of claim 1 in which transmit circuitry in the transceiver is transiently disabled.

4. The terminal of claim 1 in which the user selected elements comprise a telephone number forming part of the broadcast data and the terminal is programmed to transmit data which allows a voice call to be placed from the mobile terminal to the telephone number.

5. The terminal of claim 1 in which the elements of the broadcast data is one or more of:
   (a) names of good or services;
   (b) television program schedules;
   (c) gambling odds;
   (d) commodity prices; and
   (e) price or availability of products being displayed in a TV program.

6. The terminal of claim 1 being a mobile telephone or a plug-in card accessory for a portable computer.

7. A method of simultaneously broadcasting data using a cellular telephone network to multiple cellular telephony mobile terminals, the method comprising:
   receiving via a receiver of a select cellular telephone mobile terminal broadcast data, which is broadcast for receipt by a plurality of cellular telephone mobile terminals, which is not registered with the cellular telephone network;
   displaying on a display element of the select cellular telephone mobile terminal the broadcast data; wherein a cellular telephony transceiver of the select cellular telephone mobile terminal is adapted to not regularly register with the cellular telephone network;
   receiving a user selection of an element of the broadcast data displayed on the terminal; and
   registering with the cellular telephone network in order to transmit data, in response to the receipt of the user selection of the element of the broadcast data displayed on the terminal.

8. The method of claim 7 in which the broadcast data is one or more of:
   (a) names of goods or services;
   (b) television program schedules;
   (c) gambling odds;
   (d) commodity prices; and
   (e) price or availability of products being displayed in a TV program.

9. The method of claim 7, wherein the broadcast data is broadcast over the cellular telephone network.

* * * * *